United States Patent
Mueggenborg et al.

(10) Patent No.: US 11,822,997 B2
(45) Date of Patent: Nov. 21, 2023

(54) METHODS AND APPARATUS FOR MULTI-STAGE ACTIVATION OF COMMUNICATION DEVICES

(71) Applicant: ZEBRA TECHNOLOGIES CORPORATION, Lincolnshire, IL (US)

(72) Inventors: Alexander Mueggenborg, Arlington, VA (US); Edward A. Richley, Gaithersburg, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 563 days.

(21) Appl. No.: 16/718,999

(22) Filed: Dec. 18, 2019

(65) Prior Publication Data

US 2021/0192154 A1    Jun. 24, 2021

(51) Int. Cl.
*G06K 7/10* (2006.01)
*G06K 19/07* (2006.01)

(52) U.S. Cl.
CPC ..... *G06K 7/10158* (2013.01); *G06K 19/0709* (2013.01)

(58) Field of Classification Search
CPC ........... G06K 7/10158; G06K 19/0709; Y02D 30/70; H04B 5/0031
USPC ........................................................ 235/451
See application file for complete search history.

(56) References Cited

U.S. PATENT DOCUMENTS

| | | | |
|---|---|---|---|
| 2003/0149459 A1* | 8/2003 | Von Arx | A61N 1/37276 607/60 |
| 2015/0121108 A1 | 4/2015 | Agrawal et al. | |
| 2017/0332235 A1* | 11/2017 | Smith | G06F 1/3231 |
| 2019/0180163 A1 | 6/2019 | Awheda et al. | |

OTHER PUBLICATIONS

International Search Report and Written Opinion for International Application No. PCT/US2020/51558 dated Dec. 18, 2020.

* cited by examiner

*Primary Examiner* — Thien M Le
*Assistant Examiner* — Tae W Kim

(57) ABSTRACT

An example disclosed method includes, in response to receiving a first signal at a communication device when the communication device is in a deep sleep mode, changing the tag from the deep sleep mode to an awake mode for a period of time, wherein the communication device consumes a first amount of power in the deep sleep mode, and the communication device consumes a second amount of power in the awake mode, and the second amount of power is greater than the first amount of power; in response to receiving a second signal during the period of time when in the awake mode, changing the communication device from the awake mode to a fully functional mode, wherein the communication device consumes a third amount of power in the fully functional mode, and the third amount of power is greater than the second amount of power; and, in response to not receiving the second signal during the period of time, changing the communication device from the awake mode to the deep sleep mode.

5 Claims, 4 Drawing Sheets

| Deep Sleep Mode | State |
|---|---|
| Magnetic Interface | Off |
| Nearfield Radio Frequency (RF) Interface | Idle |
| Controller | Idle |
| Farfield RF Interface | Off |
| Awake Mode | |
| Magnetic Interface | On |
| Nearfield RF Interface | On |
| Controller | On |
| Farfield RF Interface | Off |
| Fully Functional Mode | |
| Magnetic Interface | On |
| Nearfield RF Interface | On |
| Controller | On |
| Farfield RF Interface | On |

FIG. 3

METHODS AND APPARATUS FOR MULTI-STAGE ACTIVATION OF COMMUNICATION DEVICES

FIELD

Examples disclosed herein are related to communication devices and, more particularly, to methods and apparatus for multi-stage activation of communication devices.

BRIEF DESCRIPTION OF THE DRAWINGS

FIG. 3 is a table showing example states of components of the example wireless communication device of FIG. 2 in various example modes.

DETAILED DESCRIPTION

Figure 1:
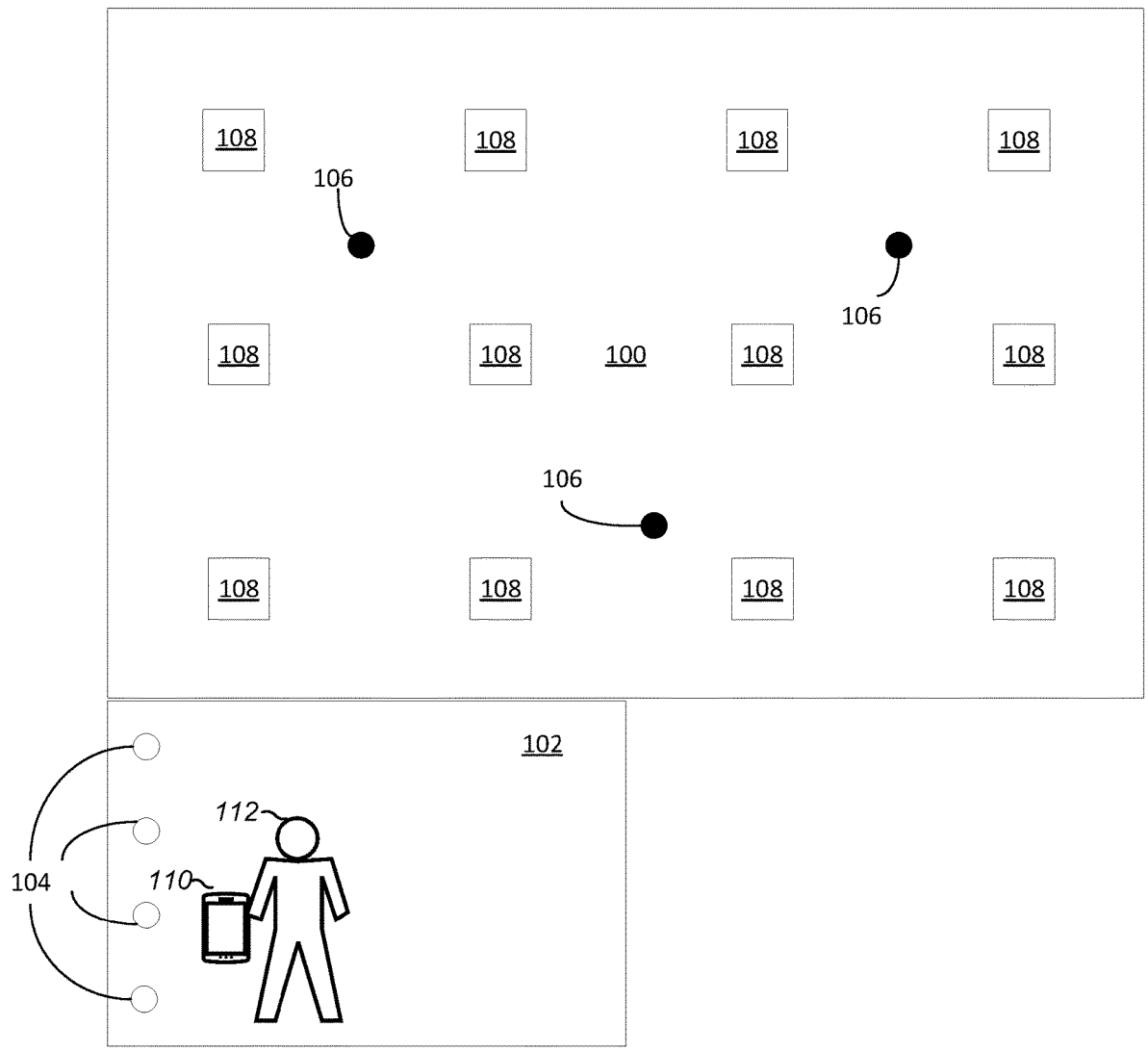
FIG. 1 depicts an example system including communication devices deployed in an example area.

Communication devices send and/or receive signals using one or more wireless and/or wired interfaces. Examples interfaces include radio frequency (RF) transceivers, RF receivers, RF transmitters, magnetic-field interfaces, and wired interfaces. Some communication devices, such as active radio frequency identification (RFID) tags, have an internal power source (e.g., a battery) that provides power to one or more components thereof (e.g., one or more of the interfaces. While some examples disclosed herein refer to and are explained using active RFID tags, teachings of this disclosure are applicable to any suitable communication device.

Some communication devices, such as active RFID tags, are configured to periodically (e.g., ten times per second) transmit signals at a predetermined power level. Such periodic transmissions are sometimes referred to as beacons. Notably, transmitting such signals consumes energy from a power source (e.g., an internal or external battery). The active transmission of these signals is distinguished from a passive transmission that utilizes externally provided energy (e.g., via backscatter of a signal provided by, for example, an RFID reader).

In addition to transmitting signals, some RFID tags receive signals via one or more interfaces. While some interfaces passively rely on externally provided energy, others are active and are powered by an internal power source. For example, a magnetic-field interface receives power from an internal battery to enable wireless communications with another magnetic-field interface. In some instances, the amount of power drawn by component(s) of such interface(s) varies according to a desired level of performance and/or capability. For example, an increased amount of power drawn by a communication component may enable that component to have a greater communication range).

When an RFID tag is transmitting and/or actively waiting (i.e., using an internal power source) to receive a signal, a constant stream of power to the respective components is required, resulting in a constant draw from the battery. Known tags having only one operational mode in which components begin draining the battery from the moment the RFID tag is activated and do not stop until the battery dies undesirably drain power even when the RFID tag is not being used (e.g., not attached to an object to track).

Some known RFID tags deactivate a far-field RF interface until an activation signal was received by a magnetic-field interface on the RFID tag, and the activation signal causes the far-field RF interface to activate. However, leaving the magnetic-field interface continuously fully active draws a significant amount of power over time. This constant power draw drains the battery over time such that when the previously deactivated far-field RF interface is activated, the internal battery is already at a reduced charge state (e.g., at half-life).

Examples disclosed herein recognize that battery charge states are undesirably consumed while RFID tags are not deployed. For example, RFID tags may remain in storage before being attached to an asset for tracking purposes. If power is consumed while the RFID tag is not deployed, the battery charge is unnecessarily reduced. It is important to note, that for the below descriptions, the battery charge or battery life refers to the power level of a battery if the battery is single use. If the battery is rechargeable, the battery charge or battery life refers to a single charge cycle between recharges for the battery. Further, examples disclosed herein recognize that deactivated RFID tags that are actively listening for a signal to activate consume significant amounts of power by, for example, continuously running a magnetic-field interface while the RIFD tag is not deployed.

To avoid this and to extend the power source, examples disclosed herein provide a multi-stage process in which the communication device is progressed through a series of operational modes. Specifically, examples disclosed herein provide a deep-sleep mode, an awake mode, and a fully functional mode. Each of the operational modes sets internal components of the communication device to a particular state. As used herein, when a component is in an off state ("off"), the component does not function and draws no power from the battery. As used herein, when a component is in an idle state ("idle"), the component is functioning or operating at a reduced level of power consumption (e.g., drawing a reduced amount of power from the battery relative to full functionality). When a component is in an on state ("on"), the component is functioning or operating at a full level of power consumption (e.g., drawing an amount of current from the battery associated with full functionality). Put another way, the amount of power drawn by a component in the idle state is less than the amount of power drawn by that same component in the on state. It is important to note, even when the RFID tag is in deep-sleep mode, there is still self-discharge on the battery, where while the battery is sitting idle, the charge state can still drop. The below disclosure describes a method to decrease the amount of battery loss while the RFID tag is deactivated.

As described in detail below, example methods and apparatus disclosed herein place different interfaces of communication devices in different states according to received signals. In some examples disclosed herein, when the communication device is in the deep sleep mode, a magnetic-field interface is off, a near-field RF interface is idle, a controller is idle, and a far-field RF interface is off. Notably, having certain components off and others idle causes the communication device to consume only a small amount of power. In some examples, having the magnetic-field interface off and the near-field RF interface idle enables the communication device to operate (e.g., listen for a near-field RF signal) on nanoamps of current, as opposed to requiring microamps with the magnetic-field interface being on.

As part of a multi-stage activation process disclosed herein, the communication device receives a wake-up signal via the near-field RF interface. In response to the wake-up signal, the communication device enters the awake mode in which the magnetic-field interface is on, the near-field RF interface is on, the controller is on, and the far-field RF interface is off. Notably, having the far-field RF interface off reduces the amount of power consumption significantly. The communication device remains in the awake mode for a predetermined period of time during which the magnetic-field interface and the near-field RF interface are listening for an activation signal. As a subsequent part of the multi-stage activation process disclosed herein, if the communication receives the activation signal while in the awake mode, the communication device enters the fully functional mode. When in the fully functional mode, the magnetic interface is on, the near-field RF interface is on, the controller is on, and the far-field interface is on. If the communication does not receive the activation during the period of time corresponding to the awake mode, the communication device is returned to the deep sleep mode.

Accordingly, examples disclosed herein provide multiple operational modes in which the communication device is not in a fully functional mode and, thus, conserve power relative to the fully functional mode. The examples disclosed herein are described below in connection with the figures as example implementations in example environments. However, example power conserving methods and apparatus disclosed herein are applicable in connection with any suitable device or application.

FIG. 1 depicts an example environment in which methods and apparatus disclosed herein may be implemented. The example environment of FIG. 1 includes an active area 100 and an inactive area 102. The active area 100 contains deployed RFID tags 106 and RFID readers 108. The active environment 100 may be a retail space, a warehouse, a grocery store, or any type of space including movable objects that an entity has an interest in tracking via, for example, RFID technology. The deployed RFID tags 106 are attached or otherwise carried by an object to be tracked via the RFID readers 108 and a processing platform in communication with the RFID readers 108. The processing platform may use any suitable locationing technology or technique to determine locations of the deployed RFID tags 106 and, thus, the object carrying the respective deployed RFID tags 106 as those objects move throughout the active area 100.

The inactive area 102 contains undeployed RFID tags 104. The undeployed RFID tags 104 are not yet assigned to or carried by an object to be tracked. The example inactive area 102 may be a storeroom or any other area where currently unused tags are being stored in anticipation of future use within the active area 100.

The undeployed RFID tags 104 may be kept in the inactive area 102 for an extended period of time. If the undeployed RFID tags 104 were to be continuously transmitting signals (e.g., beacons) and/or actively listening for signals while in the inactive area 102, a battery within the undeployed RFID tag 104 would have an unnecessarily shortened charge once transferred to the active area 100. However, examples disclosed herein enable the undeployed RFID tags 104 to be stored in a deep sleep mode and to listen for a wake-up signal while consuming only, for example, nanoamps of current.

In one embodiment, the undeployed RFID tags 104 are stored in the inactive area 102 until the undeployed RFID tags 104 are assigned and attached to an object to be tracked (i.e., deployed). Because the undeployed RFID tags 104 do not need to be transmitting or listening while in the inactive area 102, the undeployed RFID tags 104 are placed in the deep sleep mode during storage. When one or more of the undeployed RFID tags 104 are selected for use in the active environment 100, that tag(s) requires activation. In the illustrated example of FIG. 1, an external activator 110 sends a wake-up signal to the selected tag(s) via a near-field RF signal. The external activator 110 is any device capable of sending a near-field RF signal such as, for example, a handheld mobile computing device carried by a person. In some examples, the external activator 110 transmits a 13.56 MHz signal that is strong enough to momentarily provide energy to, for example, an NFC chip of the tag(s) via a near-field RF antenna. Alternatively, the external activator 110 may be a fixed device mounted to, for example, a shelf or wall. Because the example wake-up signal is a near-field RF signal in the illustrated example, the external activator 110 and the selected one(s) of the tags are placed within close proximity (e.g., within 2 inches) to enable receipt of the wake-up signal. This prevents unselected one(s) of the tags from unintentionally receiving the wake-up signal and remaining in the deep sleep mode.

In some examples, the wake-up signal is transmitted from the external activator 110 as a near-field RF signal with a range of one to two feet. This example would be advantageous for situations where the goal is to activate, for example, a group the undeployed RFID tags 104, perhaps all in a box, before taking them to the active area 100 or before shipping them (e.g., to a customer). In such instances, the entire box of the RFID tags are awakened without having to remove the RFID tags from the box.

When the selected one(s) of the undeployed RFID tags 104 receives the near-field wake-up signal, the selected one(s) of the undeployed RFID tags 104 to transition from the deep sleep mode to an awake mode. While in the awake mode, the selected one(s) of the undeployed RFID tags 104 is temporarily enabled to receive an activation signal, which causes the selected one(s) of the undeployed RFID tags 104 to transition from the awake mode to a fully functional mode. Once in the fully functional mode, that tag is considered to be one of the deployed RFID tags 106 and can be used to track an object within the active area 100.

In the illustrated example, the external activator 110 provides the activation signal to the selected one(s) of the tags. In the illustrated example, the activation signal is a magnetic-field signal received by the magnetic-field interface of the tag(s). In another example, the activation signal is a near-field RF signal. In some examples, a second external activator different than the external activator 110 is used to provide the activation signal. For example, the illustrated external activator 110 of FIG. 1 may be a mobile computing device with a near-field RF interface, and another (not shown) external activator is a magnetic-field wand. In another example, the external activator 110 is a device capable of sending both a near-field RF signal and a magnetic-field signal.

In an example scenario, a person working in a warehouse enters the inactive area 102 to retrieve additional undeployed RFID tags 104 for deployment in the active area 100 (e.g., to be attached to an object that will be moving about the active area 100 so that the object can be tracked via the RFID readers 108). In this example scenario, the person approaches a plurality of undeployed RFID tags 104, all currently in the deep sleep mode. The person does not require the entire plurality of undeployed RFID tags 104, but merely a subset of the undeployed RFID tags 104. To preserve battery life, the plurality of undeployed RFID tags 104 are all in deep sleep mode and only communicable via the near-field RF interface thereof. The person approaches the subset and uses a mobile computing device with near-field RF communication capabilities to send a wake-up signal to each of the undeployed RFID tags 104 within the subset. As the distance limit for near-field RF communication is 2-3 inches, the person needs to move the mobile computing device close to the undeployed RFID tags 104 selected for deployment, which allows the person to target the subset of the undeployed RFID tags 104 and not all of the undeployed RFID tags 104. Once the person uses the mobile computing device to change the subset of the undeployed RFID tags 104 to the awake mode, the magnetic-field interface of each RFID tag 104 in the subset is listening for further instructions. A magnetic activation signal can then be sent via a magnetic-field interface to each of the subset, which changes the operational mode of the RFID tags 104 in the subset from the awake mode to the fully functional mode. In the illustrated example, the range of the magnetic-field activation signal is approximately two feet, so when working in a storeroom of a warehouse, for example, there is a high likelihood that the magnetic-field activation signal would reach more than just the subset of RFID tags 104 selected for deployment. However, because the plurality of RFID tags 104 not in the selected subset did not receive the wake-up near-field RF signal, those tags are not listening for the magnetic-field interface activation signal due to the corresponding magnetic-field interfaces being in the off state. It is imperative that the undeployed RFID tags 104 remain in deep sleep mode because deep sleep mode allows the undeployed RFID tags 104 to conserve battery life to extend future deployment time. The subset of the plurality of undeployed RFID tags 104 selected for deployment then receive the activation signal via the magnetic-field interface and transition from the awake mode to the fully functional mode. The selected subset of RFID tags 104 are now ready to be associated with items to be tracked and, thus, are then part of the deployed RFID tags 106.

Figure 2:
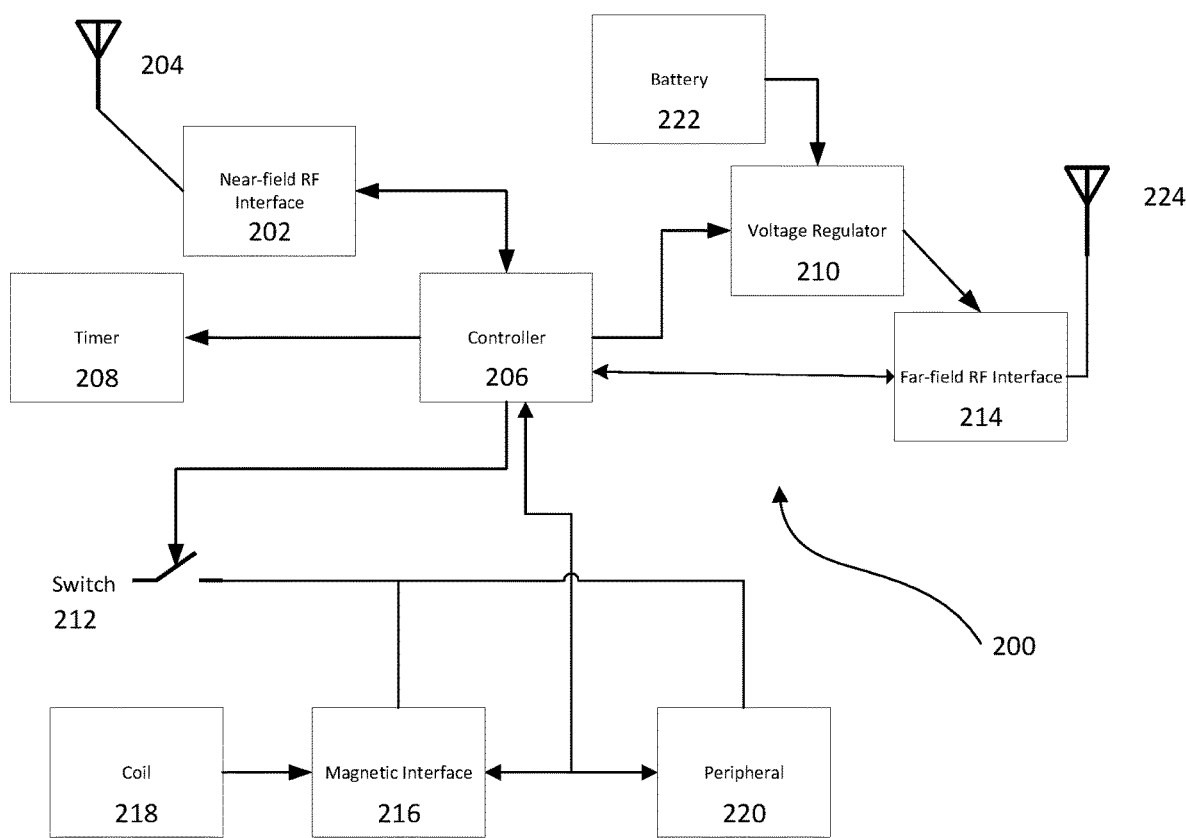
FIG. 2 is a block diagram of an example wireless communication device constructed in accordance with teachings of this disclosure.

FIG. 2 depicts an example RFID tag 200 in which the example methods and apparatus disclosed herein may be implemented. While the example of FIG. 2 is a RFID tag, example methods and apparatus disclosed herein may be implemented in any suitable communication device. The example RFID tag 200 of FIG. 2 includes a near-field RF interface 202, a near-field antenna 204, a controller 206, a timer 208, a voltage regulator 210, a switch 212, a far-field RF interface 214, a magnetic-field interface 216, a coil 218, a peripheral device 220, a battery 222, and a far-field antenna 224.

Alternative implementations of the example RFID tag 200 of FIG. 2 include one or more additional or alternative elements, processes and/or devices. Additionally, or alternatively, one or more of the example components of the example RFID tag 200 of FIG. 2 may be combined, divided, re-arranged or omitted. The example near-field RF interface 202, the example controller 206, the example timer 208, the example voltage regulator 210, the example switch 212, the example far-field RF interface 214, and the example magnetic-field interface 216 of FIG. 2 are implemented by hardware, software, firmware, and/or any combination of hardware, software and/or firmware. In some examples, at least one of the example near-field RF interface 202, the example controller 206, the example timer 208, the example voltage regulator 210, the example switch 212, the example far-field RF interface 214, and the example magnetic-field interface 216 of FIG. 2 is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more controller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations of FIG. 4. Some example logic circuits are hardware that executes machine-readable instructions to perform operations (e.g., one or more of the operations of FIG. 4). Some example logic circuits include a combination of specifically configured hardware and hardware that executes machine-readable instructions. The near-field RF interface 202 in FIG. 2 is in communication with the near-field antenna 204. The near-field RF interface 202 is capable of receiving a near-field RF signal from a near-field RF transmitting device via the near-field antenna 204. The near-field RF interface 202 is either a passive (i.e., relies on an external source of energy for power) or active component (i.e., uses power from the battery 222). The near-field RF interface 202 is in communication with the controller 206. In some embodiments, the near-field RF interface 202 is configured in accordance with ISO/IEC 14443. In the illustrated example, the near-filed RF interface 202 has a range of 1-2 inches. For example, the external activator 110 for example, must be within 1-2 inches of the near-field antenna 204 to communicate with the near-field RF interface 202.

The controller 206 of FIG. 2 controls components of the example RFID tag 200. The controller 206 is in communication with the near-field RF interface 202 and the far-field RF interface 214 to control, among other functions, the amount of power drawn from the battery 222 by the near-field RF interface 202 and the far-field RF interface 214. In the illustrated example of FIG. 2, the near-field RF interface 202 consumes a lesser amount of power from the battery 222 when fully functional than the far-field RF interface 214 when fully functional.

As described in detail below, the example RFID tag 200 of FIG. 2 is placed in one of three operational modes and undergoes a multi-stage process when being transitioned from an undeployed tag to a deployed tag. In the illustrated example of FIG. 2, the controller 206 implements the multi-stage process by storing definitions of the different operational modes and the corresponding states for the components of the RFID tag 200. In the illustrated example, the data representative of the operational modes and the corresponding states is stored in a data structure (e.g., a table) in memory accessible by the controller 206.

The timer 208 enables the controller 206 to place the RFID tag 200 in different operational modes (e.g., the awake mode) for a particular period of time. In the illustrated example, after receiving a start-timer signal from the controller 206, the timer 208 sends an end-timer signal to the controller 206 after a predetermined period of time elapses from when the start-timer signal was received. In the illustrated example, the timer 208 is shown as separate from the controller 206. In some examples, the controller 206 internally implements the function of the timer 208.

The switch 212 is a physical switch or an electrical switch. In the illustrated example, the switch 212 actuates in response to receiving a signal from the controller 206. The example switch 212 of FIG. 2 is in-line with a circuit that supplies power to the magnetic-field interface 216 when the switch 212 is closed. The switch 212 opens upon receiving another signal from the controller 206 to prevent the magnetic-field interface 216 from receiving power. In some embodiments, the switch 212 is a field effect transistor switch. In some examples, this switch 212 may be shared or one or more additional switches control whether other components (e.g., the far-field RF interfaces 214 and/or the peripheral 220) receives power from the battery 222. Additionally, or alternatively, the switch 212 and/or other switch (es) regulate an amount of power being delivered or drawn by one or more of the components.

The magnetic-field interface 216 communicates with external magnetic interfaces via the coil 218. The coil 218 receives signals from external devices in the form of changes in magnetic fields. The coil 218 provides received signals to the magnetic-field interface 216. In the illustrated example, the magnetic-field interface 216 is only operational (i.e., receiving power from the battery 222) when the switch 212 is in the closed position (e.g., as controlled by the controller 206). In the illustrated example, the coil 218 is resonant at 125 kHz.

The example peripheral device 220 of FIG. 2 is a sensor, an accelerometer, a temperature sensor, or an equivalent type of sensor that is known to be used in association with an RFID tag. The peripheral device 220 is in-line with the switch 212 and, therefore, power is available to the peripheral device 220 according to a state of the switch 212. In the illustrated example, the peripheral device 220 is off in the deep sleep mode and the peripheral device 220 is on in the awake mode and fully functional mode. In some examples, the RFID tag 200 includes a plurality of peripheral devices 220. In the illustrated embodiment, the peripheral device 220 shares the switch 212 with the magnetic-field interface 216 and is therefore on when the magnetic-field interface 216 is on.

The example far-field RF interface 214 of FIG. 2 utilizes the far-field antenna 224 to send and/or receive RF signals such as, for example, bursts of ultra-wide band signals. The example far-field RF interface 214 of FIG. 2 transmits signals according to instructions received from the controller 206. In some embodiments, the far-field RF interface 214 receives far-field RF signals from external devices and sends the received signals to the controller 206. In some embodiments, the far-field RF interface 214 receives power from the battery 222 via the voltage regulator 210. The voltage regulator 210 is operable to regulate current received from the battery 222 to allow the far-field RF interface to have a steady current during operation. In some embodiments, the far-field antenna 224 is a 6.5 GHz antenna.

In some embodiments, the battery 222 provides power to the near-field RF interface 202. In the depicted embodiment, the near-field RF interface 202 does not draw a current unless the near-field RF interface 202 receives a signal. In the depicted embodiment, when the near-field RF interface 202 receives a signal, the near-field RF interface 202 then draws 240 microamps. In the depicted embodiment, the far-field RF interface 214 draws 1.5 milliamps of current when a message is being transmitted, however when no message is being transmitted, the far-field RF interface 214 draws no current.

FIG. 3 depicts an example set of operational modes and corresponding states to implement the multi-stage activation process disclosed herein. The example of FIG. 3 includes three operational modes for the example RFID tag 200 of FIG. 2. The three operational modes allow the RFID tag 200 to draw a lesser amount of charge from the battery 222 while undeployed, which extends the charge of the battery 222. The example operational modes of FIG. 3 are referred to as "operational" because in each one of the modes at least one component is at least partially operational.

As depicted in the table of FIG. 3, when the RFID tag 200 is in the deep sleep mode, the least amount of total power is drawn from the battery 222 relative to the other operational modes. In some embodiments, the RFID tag 200 is set in the deep sleep mode immediately following manufacture. When in the deep sleep mode, the magnetic-field interface 216 is off, the near-field RF interface 202 is idle, the controller 206 is idle, and the far-field RF interface 214 is off. When in the deep sleep mode, the idle near-field RF interface 202 and the idle controller 206 are drawing a lesser amount of power from the battery 222 compared to the same components when in the on state. In one embodiment, the idle near-field RF interface 202 is drawing no power as a passive near-field RF interface and will wait for a near-field signal of 13.56 MHz to energize the antenna and pass a signal to the microcontroller 206.

The controller 206 transitions the RFID tag 200 from the deep sleep mode to the awake mode after receiving the wake-up signal via the near-field RF interface 202. In the awake mode, the magnetic-field interface 216 is on, the near-field RF interface 202 is on, the controller 206 is on, and the far-field RF interface 214 is off. To begin the period of time that the RFID tag 200 is able to transition to the fully functional mode, the controller 206 sets a timer to initiate the period of time during which the RFID tag 200 is placed in the awake mode. Additionally, the controller 206 sends a signal to actuate the switch 212, thereby supplying power from the battery 222 to the magnetic-field interface 216. While the illustrated example of FIG. 3 includes the magnetic-field interface 216 and the near-field RF interface 202 both drawing power from the battery 222 when in the awake mode, some alternative examples include only one of the magnetic-field interface 216 and the near-field RF interface 216 being on in the awake mode.

In the example of FIG. 3, when the RFID tag 200 is in the awake mode, the near-field RF interface 202 and the magnetic interface 216 are both simultaneously drawing power to listen for possible communication signals. In some embodiments, the far-field RF interface 214 is on when the RFID tag 200 is in awake mode. In some embodiments, when in the awake mode and the fully-functional mode, the near-field RF interface 202 draws 240 microamps and the magnetic-field interface 216 draws 12 microamps. In the illustrated example, when in the period of time implemented by the timer ends, if neither the near-field RF interface 202 nor the magnetic-field interface 216 received an activation signal (e.g., from the external activator 110 or another device), the controller 206 de-actuates the switch 212, thereby disconnecting the magnetic-field interface 216 from the battery 222. In doing so, the controller 206 transitions the RFID tag 200 from the awake mode to the deep sleep mode.

On the other hand, if the RFID tag 200 receives an activation signal while in the awake mode (via either the magnetic interface 216 or the near-field RF interface 202), the controller 206 transitions the RFID tag 200 from the awake mode to the fully functional mode. In some embodiments, the RFID tag 200 remains in the fully functional mode for the rest of the life of the battery 222. Alternatively, the controller 206 transitions the RFID tag 200 from the fully functional mode to the deep sleep mode in response to, for example, a deactivation signal. In some embodiments, the deactivation signal is received by either the near-field RF interface 202, the magnetic interface 216, or the far-field RF interface 214.

In the depicted embodiment of FIG. 3, when the tag 200 is in the fully functional mode, the magnetic interface 216 is on, the near-field RF interface 202 is on, the controller 206 is on, and the far-field RF interface 214 is on. When in the fully functional mode, the RFID tag 200 is fully operational and transmitting signals (e.g., beacons) as a far-field RF tag. The signals transmitted by the far-field RF antenna 224 via the far-field interface 214 are readable by, for example, the RFID readers 108 of FIG. 1 and able to be processed to locate the RFID tag 200. When on, the far-field RF interface 214 draws the most power from the battery 222 compared to the near-field RF interface 202 (when on) and the magnetic-field interface 216 (when on). In the illustrated embodiment, the far-field RF interface 214 draws about 1.5 milliamps when fully functional.

Figure 4:
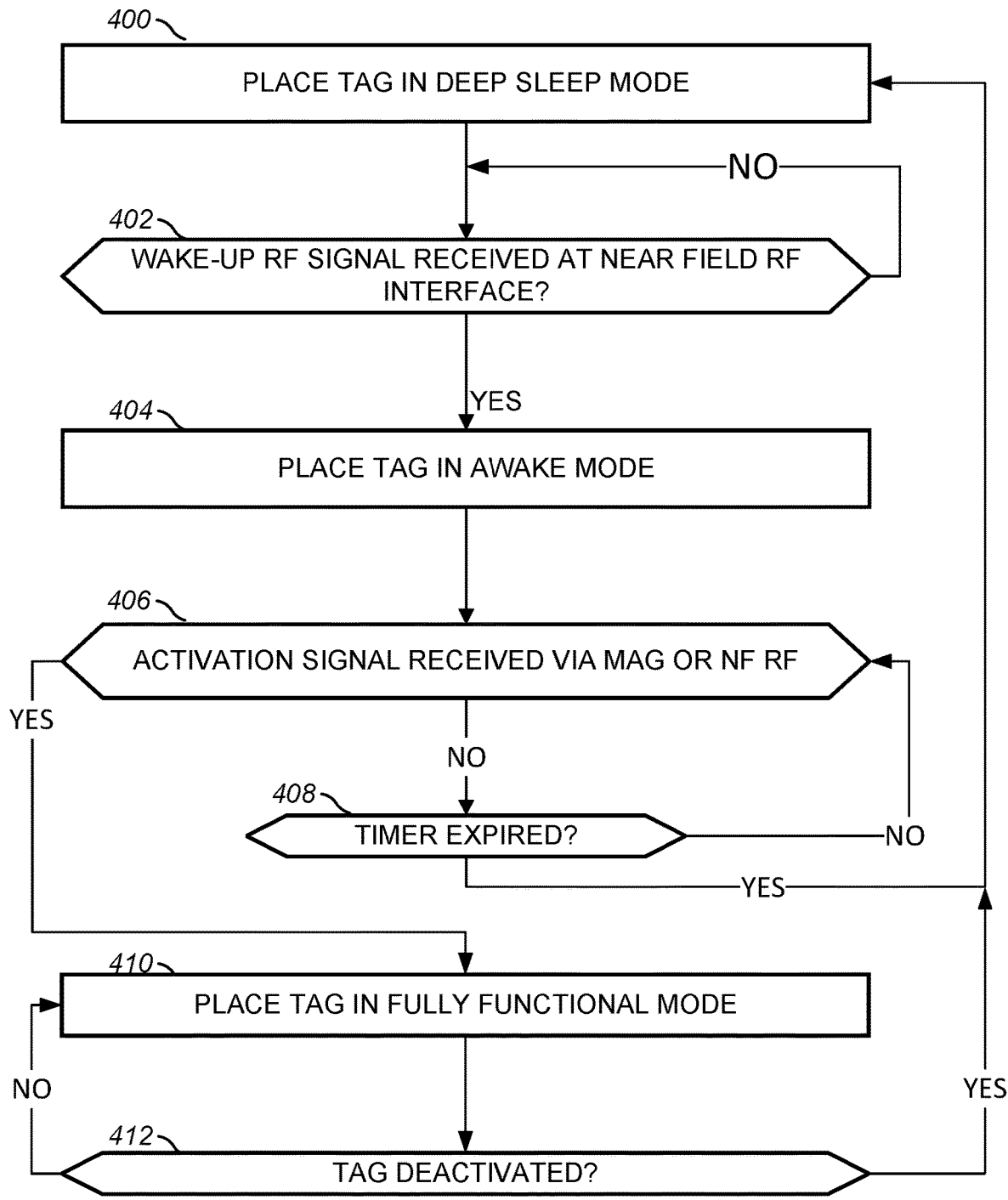
FIG. 4 is flowchart representative of an example method according to teachings of this disclosure.

FIG. 4 is a flowchart representative of example operations for implementing the example RFID tag 200 of FIG. 2. Alternative example implementations of the operations of FIG. 4 include one or more additional or alternative operations. Additionally, or alternatively, one or more of the operations of the example flowchart of FIG. 4 may be combined, divided, re-arranged or omitted. In some examples, the operations of FIG. 4 are implemented by machine-readable instructions (e.g., software and/or firmware) stored on a medium (e.g., a tangible machine-readable medium) for execution by one or more logic circuits (e.g., processor(s)). In some examples, the operations of FIG. 4 are implemented by one or more configurations of one or more specifically designed logic circuits (e.g., ASIC(s)). In some examples the operations of FIG. 4 are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Initially, the RFID tag 200 is placed in the deep sleep mode (block 400). As described above, when the RFID tag 200 is manufactured, it may be set in the deep sleep mode to minimize or at least reduce the amount of power consumed from the battery 222 while the RFID tag 200 is not deployed and, thus, not in need of amounts of power associated with functionality (e.g., transmission of signals at readable ranges). In the context of FIG. 1, the RFID tag 200 may remain in the deep sleep mode while stored in the inactive area 102. If the RFID tag 200 is sent a magnetic activation signal while in the deep sleep mode, the RFID tag 200 would not react as when the RFID tag 200 is in deep sleep mode, the magnetic interface 216 is off and not receiving signals.

In the example of FIG. 4, the RFID tag 200 is listening for a wake-up RF signal via the near-field RF interface 202, which is idle in the deep sleep mode (block 402). Such a signal is sent by, for example, a person wanting to deploy certain one(s) of the undeployed tags 104 of FIG. 1 using the external activator 110.

If the wake-up signal is received, the controller 206 transitions the RFID tag 200 from the deep sleep mode to the awake mode (block 404). Otherwise the RFID tag remains in the deep sleep mode (block 402).

While in the awake mode, the RFID tag 200 waits for an activation signal via the magnetic-field interface 216 and/or the near-field RF interface 202 (block 406). If the activation signal is received within the period of time implemented by the timer 208, the controller 206 transitions the RFID tag 200 from the awake mode to the fully functional mode (block 410). To continue the above example scenario, the person wanting to deploy certain one(s) of the RFID tags uses the external activator 110 or any other suitable communication device to send a magnetic-field signal that includes the activation signal when in the inactive area 202. If the period of time implemented by the timer 208 expires prior to an activation signal being received, the RFID tag 200 reverts back to the deep sleep mode (block 400). If an activation signal is sent to the RFID tag 200 after the timer 208 expires and the RFID tag 200 reverts back to deep sleep mode, then there is no change in state for the RFID tag 200. One scenario this allows for are situations where the user accidently sends a wake-up signal to the RFID tag 200. In this case, the RFID tag 200 would temporarily be in the awake mode awaiting an activation signal, and then not receive an activation signal, causing the RFID tag 200 to revert back to the deep sleep mode to conserve battery charge.

While in the fully functional mode, the RFID tag 200 is completely functional. The controller 206 enables the battery 222 to provide power to the far-field RF interface 214. The far-field RF interface 214, while in the fully functional mode, beacons out far-field RF signals (e.g., UWB signal) during normal operation that enable the RFID tag 200 to be located by a system including, for example, the RFID readers 108.

In the example of FIG. 4, the RFID tag 200 is deactivated by, for example, the battery 222 running out of life. Alternatively, the RFID tag 200 can be placed back in the deep sleep mode by a deactivation signal received by the RFID tag 200. The deactivation signal may be received via the near-field RF interface 202, far-field RF interface 214, or by magnetic-field interface 216. When the RFID tag 200 reverts back to the deep sleep mode, the states of the components within the RFID tag 200 all revert back to the deep sleep mode as discussed above.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

That which is claimed:

1. A method comprising:
   in response to receiving a first signal at a communication device having a magnetic-field interface, a near-field radio frequency (RF) interface and a far-field RF interface, when the communication device is in a deep sleep mode, changing the communication device from the deep sleep mode to an awake mode for a period of time, wherein the communication device consumes a first amount of power in the deep sleep mode, and the communication device consumes a second amount of power in the awake mode, and the second amount of power is greater than the first amount of power;
   in response to receiving a second signal during the period of time when in the awake mode, changing the communication device from the awake mode to a fully functional mode, wherein the communication device consumes a third amount of power in the fully functional mode, and the third amount of power is greater than the second amount of power; and
   in response to not receiving the second signal during the period of time, changing the communication device from the awake mode to the deep sleep mode, wherein
   in the deep sleep mode, the magnetic-field interface is in an off state, the near field RF interface is in an idle state, and the far-field RF interface is in the off state, and
   in the awake mode, the magnetic-field interface is in the on state, the near-field RF interface is in the on state, and the far-field RF interface is in the off state.

2. The method of claim 1, wherein the first signal is received via the near-field RF interface.

3. The method of claim 2, wherein the second signal is received via the magnetic-field interface or near-field radio frequency RF interface.

4. The method of claim 3, wherein the magnetic-field interface is on in the fully functional mode.

5. The method of claim 1, further comprising changing the communication device from the fully functional mode to the deep sleep mode in response to receiving a third signal.

* * * * *